No. 817,398. PATENTED APR. 10, 1906.
V. G. SMITH.
DRILL ROD COUPLING.
APPLICATION FILED APR. 20, 1905.
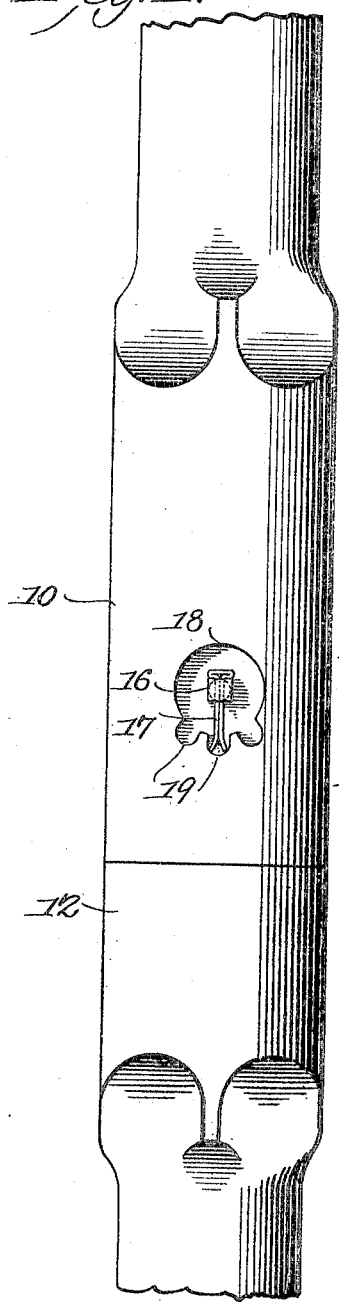
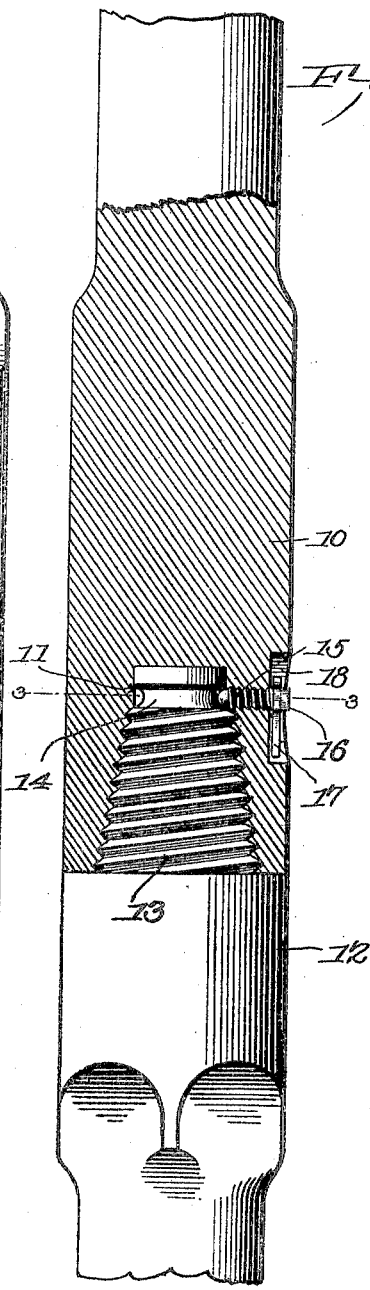
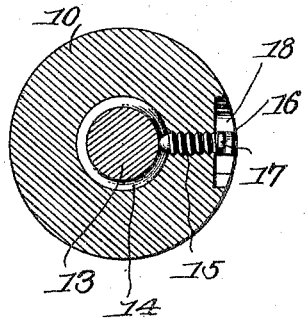
Witnesses
Voorhees G. Smith,
Inventor.
by
Attorneys

UNITED STATES PATENT OFFICE.

VOORHEES G. SMITH, OF IOLA, KANSAS, ASSIGNOR OF ONE-FOURTH TO DANIEL B. D. SMELTZER AND ONE-FOURTH TO GEORGE D. SMELTZER, OF IOLA, KANSAS.

DRILL-ROD COUPLING.

No. 817,398.  Specification of Letters Patent.  Patented April 10, 1906.

Application filed April 20, 1905. Serial No. 256,618.

*To all whom it may concern:*

Be it known that I, VOORHEES G. SMITH, a citizen of the United States, residing at Iola, in the county of Allen and State of Kansas, have invented a new and useful Drill-Rod Coupling, of which the following is a specification.

This invention relates to drill-rod couplings, and has for its principal object to provide a novel means for insuring a rigid connection between the adjacent sections of drill-rods and similar devices.

With this and other objects in view, as will more fully hereinafter appear, the invention consists in certain novel features of construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is a side elevation of two parts of a drill-rod provided with connecting devices in accordance with the invention. Fig. 2 is a sectional elevation of the same. Fig. 3 is a sectional plan view of the device on the line 3 3 of Fig. 2.

Similar numerals of reference are employed to indicate corresponding parts throughout the several figures of the drawings.

In the coupling of drill-rod sections it is important that the connection be perfectly rigid and secure, that accidental separation of the parts due to independent twisting or turning of the sections or to jar be prevented, and that the fastening means be arranged wholly within the limits of the greatest diameter of the drill-rod.

In carrying out the present invention each section of the drill-rod is provided at one end with a socket and at the opposite end with a threaded stem arranged to enter the socket.

The section 10 is shown as provided with a socket 11, and the section 12 has a threaded stem 13, tapered in form and provided on its tapered face with a continuous screw-thread fitting in a corresponding female thread in the wall of the socket 11. At the top of the threaded portion the stem is provided with an annular groove 14, semicircular in cross-section, and the end of the stem extends slightly above this screw and is arranged to seat flat against the correspondingly-shaped inner end of the recess, the parts being so proportioned that when the stem is screwed home the head of the stem will rest against the inner wall of the recess, and the adjacent ends of the coupling-rod sections at points outside the threaded stem will abut against each other.

The section 10 is provided with a radially-extending threaded opening 15 for the reception of a locking-screw 16, having a semispherical head that fits within the groove 14, the projecting end of the screw being of rectangular or other non-circular form for engagement by a wrench, and the head is further provided with a diametrically-extending opening for a cotter-pin 17 of the usual construction. The head 16 and the cotter-pin are arranged within a recess 18, surrounding the head, said recess being of such depth that no portion of the head can protrude beyond the line of the outer face of the drill-rod sections. The recess 18 is circular for the most part, its minor diameter being greater than the length of the cotter-pin, so that if the latter is drawn through the opening in the head 16 until its enlarged head is adjacent the circular wall of the recess the cotter-pin and bolt may both be freely turned until the end of the bolt has entered the groove 14. The wall of the recess 18 is provided with a plurality of notches 19, into any one of which the end of the cotter-pin may be introduced, there being a plurality of openings shown in order to provide for wear.

When the parts are being assembled, the stem 13 is screwed into the recess 11 and then the bolt 16 is partly turned into threaded opening 15. The cotter-pin is then extended through the opening before the head 16 has passed into the recess, and the cotter-pin and bolt are then turned together until the end of the bolt has fully entered the recess or groove 14. The cotter-pin is then moved diametrically of the bolt-head until one of its ends has entered one of the recesses 19, and the parts are thus firmly locked in place, there being no danger of separation of the sections or of the outward movement of the locking-bolt to a position where its head would be likely to catch in the wall of the opening being formed.

Having thus described the invention, what is claimed is—

1. In a rod-coupling, a rod having at one end a recess tapered for the greater portion of its length and provided with an internal thread, said rod being further provided with a radially-disposed set-screw-receiving opening and having at its periphery a recess surrounding the wall of the opening, the wall of said recess being provided with a plurality of notches, a second drill-rod section having a threaded stem tapered for the greater portion of its length and provided near its extreme inner end with an annular groove, a set-screw extending through the radial opening and entering said groove, the head of the set-screw having a diametrical opening, and a cotter-pin arranged in said diametrical opening and movable in the direction of its length to introduce one of its ends into locking engagement with any one of the notches, the pin when free from the notches having unrestricted revoluble movement to permit adjustment of the set-screw.

2. In a drill-rod coupling, a rod-section having at one end a tapering recess provided with an internal thread, a second section having a threaded stem entering said recess and provided with an annular groove, a set-screw extending through an opening in the first section and entering said groove, the periphery of said second section being provided with a recess through which the head of the set-screw extends, and the wall of said recess being notched, and a cotter-pin carried by the head of the set-screw and movable in the direction of its length into locking engagement with said notch, the pin when moved in the opposite direction being freely revoluble within said recess to permit adjustment of the set-screw.

In testimony that I claim the foregoing as my own I have hereto affixed my signature in the presence of two witnesses.

VOORHEES G. SMITH.

Witnesses:
W. H. HAMILTON,
C. M. COLE.